(12) United States Patent
Lou et al.

(10) Patent No.: US 11,355,109 B2
(45) Date of Patent: Jun. 7, 2022

(54) METHOD AND APPARATUS FOR MAN-MACHINE CONVERSATION, AND ELECTRONIC DEVICE

(71) Applicant: Beijing Baidu Netcom Science and Technology Co., Ltd., Beijing (CN)

(72) Inventors: Xuefeng Lou, Beijing (CN); Qingwei Huang, Beijing (CN); Weiwei Wang, Beijing (CN); Cheng Peng, Beijing (CN); Xiaojun Zhao, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 172 days.

(21) Appl. No.: 16/709,465

(22) Filed: Dec. 10, 2019

(65) Prior Publication Data

US 2020/0342868 A1    Oct. 29, 2020

(30) Foreign Application Priority Data

Apr. 24, 2019    (CN) .......................... 201910333249.7

(51) Int. Cl.
*G10L 15/22*    (2006.01)
*G06N 3/00*    (2006.01)
*G06N 5/02*    (2006.01)
*G10L 13/00*    (2006.01)
*G10L 15/18*    (2013.01)

(52) U.S. Cl.
CPC .............. *G10L 15/22* (2013.01); *G06N 3/004* (2013.01); *G06N 5/02* (2013.01); *G10L 13/00* (2013.01);
(Continued)

(58) Field of Classification Search
CPC .... G10L 15/22–2015/228; G10L 13/00; G10L 15/1815; G06N 3/004; G06N 5/02
See application file for complete search history.

(56) References Cited

U.S. PATENT DOCUMENTS

2010/0049513 A1*    2/2010    Huang ................... G10L 15/22
                                                                704/231
2010/0049517 A1*    2/2010    Huang ................ H04M 3/4936
                                                                704/251
(Continued)

FOREIGN PATENT DOCUMENTS

CN         103000052 A        3/2013
CN         106775649 A        5/2017
(Continued)

OTHER PUBLICATIONS

Pappaioannou, I. et al.; "Human-Robot Interaction Requires More Than Slot Filling—Multi-Threaded Dialogue for Collaborative Tasks and Social Conversation"; FAIM/ISCA Workshop on Artificial Intelligence for Multimodal Human Robot Interaction, Jul. 14-15, 2018, Stockholm, Sweden, pp. 61-64 (5 pages).
(Continued)

*Primary Examiner* — Abul K Azad
(74) *Attorney, Agent, or Firm* — Nixon Peabody LLP

(57) ABSTRACT

Embodiments of the present disclosure provide a method and apparatus for man-machine conversion, and an electronic device. The method includes: outputting question information to a user based on a first task of a first conversation scenario; judging, in response to receiving reply information returned by the user, whether to trigger a second conversation scenario based on the reply information; generating, in response to determining the second conversation scenario being triggered based on the reply information, response information corresponding to the reply information based on the second conversation scenario; and outputting the response information to the user.

12 Claims, 5 Drawing Sheets

(52) U.S. Cl.
CPC .... *G10L 15/1815* (2013.01); *G10L 2015/223* (2013.01)

(56) References Cited

U.S. PATENT DOCUMENTS

| | | | | |
|---|---|---|---|---|
| 2013/0316679 | A1* | 11/2013 | Miller | H04M 3/568 |
| | | | | 455/412.1 |
| 2017/0060839 | A1* | 3/2017 | Kawamura | G06F 40/30 |
| 2018/0233139 | A1* | 8/2018 | Finkelstein | G06F 3/0304 |
| 2019/0066669 | A1 | 2/2019 | Sabur et al. | |

FOREIGN PATENT DOCUMENTS

| | | |
|---|---|---|
| CN | 108763352 A | 11/2018 |
| JP | 2007018245 A | 1/2007 |
| WO | WO 2006/129993 A1 | 12/2006 |

OTHER PUBLICATIONS

Won-ki Choi et al.; "Agent Platform in a Multi-Agent System Providing Medical Information"; MAMI, The Korean Institute of Information Scientists and Engineers, Oct. 2001, 7(5), pp. 489-497, with English abstract; retrieved from http://www.dbpia.co.kr/journallarticleDetail?nodeId=NODE00609852 on May 13, 2021 (10 pages).

Won-ki Choi et al.; "Agent Platform in a Multi-Agent System Providing Medical Information"; with English abstract (10 pages).

Sungsoo Lim et al.; "Domain Independent Script Language for Constructing Mixed-Initiative Conversational Agent" Proceedings of Korean Information Science Society Conference, vol. 33, No. 2(B), pp. 269-273, with English abstract; Oct. 20, 2006; pISSN: 1598-5164 (6 pages).

\* cited by examiner

METHOD AND APPARATUS FOR MAN-MACHINE CONVERSATION, AND ELECTRONIC DEVICE

CROSS-REFERENCE TO RELATED APPLICATIONS

This application claims priority to Chinese Patent Application No. 201910333249.7, filed on Apr. 24, 2019, titled "Method and apparatus for man-machine conversation, and electronic device," which is hereby incorporated by reference in its entirety.

TECHNICAL FIELD

Embodiments of the present disclosure relate to the field of artificial intelligence technology, and particularly to a method and apparatus for man-machine conversation, and an electronic device.

BACKGROUND

A conversation system is a man-machine interaction system based on a natural language. With the conversation system, a specific task, such as information query, or service acquisition, may be accomplished by a plurality of rounds of interaction using the natural language and a computer.

With the increasingly maturing natural language processing technology, a smart conversation technology becomes increasingly widely used in application scenarios or products, such as smart customer services, smart outgoing calls, and smart speakers. Different from a passive response application scenario, such as smart speakers and smart customer services, the smart outgoing call means that the conversation system actively initiates a conversation, dominates the conversation throughout the conversation, and guides the conversation to be performed in a preset task.

At present, a conversation approach applied to an outgoing call scenario can merely guide a user to perform the conversation in a preset process, but cannot respond to active questions of the user, thereby resulting in poor interaction.

SUMMARY

Embodiments of the present disclosure provide a method and apparatus for man-machine conversation, and an electronic device, so as to solve the problem of poor interaction by the conversation approach applied to the outgoing call scenario.

In a first aspect, an embodiment of the present disclosure provides a method for man-machine conversation, including: outputting question information to a user based on a first task of a first conversation scenario; judging, in response to receiving reply information returned by the user, whether to trigger a second conversation scenario based on the reply information; generating, in response to determining the second conversation scenario being triggered based on the reply information, response information corresponding to the reply information based on the second conversation scenario; and outputting the response information to the user.

In a second aspect, an embodiment of the present disclosure provides an apparatus for man-machine conversation, including: a first outputting module configured to output question information to a user based on a first task of a first conversation scenario; a first judging module configured to judge, in response to receiving reply information returned by the user, whether to trigger a second conversation scenario based on the reply information; a first response information generating module configured to generate, in response to determining the second conversation scenario being triggered based on the reply information, response information corresponding to the reply information based on the second conversation scenario; and a second outputting module configured to output the response information to the user.

In a third aspect, an embodiment of the present disclosure provides an electronic device, including a processor, a memory, and a computer program stored on the memory and running on the processor, where the computer program, when executed by the processor, implements the operations of the method for man-machine conversation.

In a fourth aspect, an embodiment of the present disclosure provides a computer readable storage medium, storing a computer program thereon, where the computer program, when executed by a processor, implements the operations of the method for man-machine conversation In the embodiments of the present disclosure, question information is outputted to a user based on a first task of a first conversation scenario; in response to receiving reply information returned by the user, whether to trigger a second conversation scenario is judged based on the reply information; in response to determining the second conversation scenario being triggered based on the reply information, response information corresponding to the reply information is generated based on the second conversation scenario; and the response information is outputted to the user. Thus, in the case where the user triggers the second conversation scenario, the electronic device may respond to the response information of the user in the second conversation scenario, thereby improving the intelligence and fluency of man-machine interaction, and enhancing the performance of man-machine interaction.

BRIEF DESCRIPTION OF THE DRAWINGS

To more clearly describe the technical solutions of embodiments of the present disclosure, the accompanying drawings to be used in the description of the embodiments of the present disclosure will be briefly introduced below. Apparently, the accompanying drawings described below are merely some embodiments of the present disclosure. For those of ordinary skills in the art, other drawings may also be obtained based on these drawings without making inventive efforts.

DETAILED DESCRIPTION OF EMBODIMENTS

The technical solutions of embodiments of the present disclosure will be clearly and completely described below in conjunction with the accompanying drawings in the embodiments of the present disclosure. Apparently, the embodiments described below are a part, instead of all, of the embodiments of the present disclosure. All other embodiments obtained by those of ordinary skills in the art based on the embodiments of the present disclosure without making inventive efforts fall within the scope of protection of the present disclosure.

Figure 1:
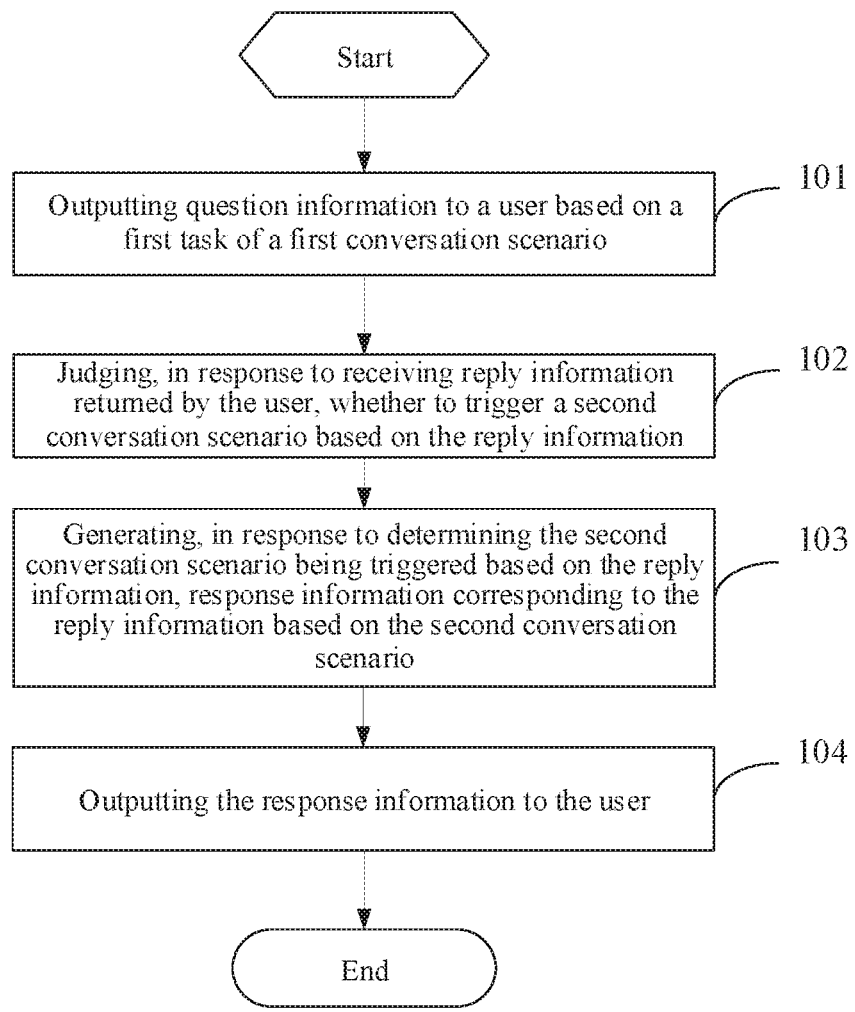
FIG. 1 is a first one of schematic flowcharts of a method for man-machine conversation provided in an embodiment of the present disclosure.

Referring to FIG. 1, FIG. 1 is a flowchart of a method for man-machine conversation provided in an embodiment of the present disclosure. As shown in FIG. 1, the method includes the following steps.

Step 101: outputting question information to a user based on a first task of a first conversation scenario.

The method for man-machine conversation in the present embodiment may be applied to a task-based outgoing call scenario, such as questionnaire, after-sales return visit, and sales lead filtering. In the task-based outgoing call scenario, an electronic device of the method for man-machine conversation in the present embodiment is applied to actively initiate a question. The electronic device may be a robot.

All conversation processes with prior and subsequent logical sequences constitute a scenario (i.e., a conversation scenario). For example, in a weather querying scenario, after a user expresses his intention to query the weather, the robot will ask back the user to collect a necessary entity (such as: a location), and then complete querying the weather, which is a plurality of rounds of scenarios of querying the weather.

In case of a single round of conversation, such as a frequently asked question (FAQ), a knowledge graph (KG), or chatting, then a question and an answer form a scenario, and In an outgoing call conversation system, a single separate question or a list of some questions with prior and subsequent logical relationships (sequential relationship, conditional skipping) constitutes a scenario.

For example, for a questionnaire on e-commerce, it is necessary to collect information, such as user's gender, age, online shopping frequency, online shopping time, and online shopping platform. A list of questions of the questionnaire constitutes the conversation scenario, and the user's gender, age, online shopping frequency, online shopping time, and online shopping platform may be considered as a plurality of tasks in the conversation scenario. When actively initiating a question to the user, the electronic device outputs question information to the user based on a task in the conversation scenario.

The question information may be construed as a question determined based on the first task of the first conversation scenario. For example, for the online shopping frequency (the online shopping frequency is a task) in the above questionnaire scenario, the question information that may be outputted by the electronic device to the user is "how often do you shop online" or "how many times on average do you shop online per week," and the like.

The question information may be text information or voice information, which is not limited here. For example, when the electronic device sends information to the user via a short message (the short message includes a SMS, or a message sent via chatting software), the question information may be outputted in the text form or in the form of voice; while when the electronic device interacts with the user via a voice call, the question information is outputted in the form of voice.

In some embodiments of the present disclosure, the user may be understood as a user interacting with the electronic device via a client. When outputting information to the user, the electronic device outputs information to the client used by the user; and when receiving user information, the electronic device receives information sent by the client used by the user. The client may be a mobile phone, a tablet personal computer, a laptop computer, a personal digital assistant (PDA for short), a mobile Internet device (MID for short), or a wearable device, or the like.

Step 102: judging, in response to receiving reply information returned by the user, whether to trigger a second conversation scenario based on the reply information.

The reply information may be text information or voice information, which is not limited here. When the electronic device sends information to the user via a short message, the reply information may be text information or voice information; while when the electronic device interacts with the user via a voice call, the reply information is voice information.

The second conversation scenario is a conversation scenario different from the first conversation scenario. For example, querying the weather, booking a hotel room or Q&A knowledge belong to different conversation scenarios. Both the first conversation scenario and the second conversation scenario can be processed by the electronic device. The electronic device presets a corresponding response strategy for each conversation scenario.

Content included in the reply information of the user is not fixed. The reply information may include content in reply to the question information, and may alternatively include a presented question. If the reply information includes a question presented by the user, then the electronic device needs to reply the question presented by the user, to improve the interactive performance. Judging whether to trigger the second conversation scenario based on the reply information may be understood as whether the reply information includes the question presented by the user.

Step 103: generating, in response to determining the second conversation scenario being triggered based on the reply information, response information corresponding to the reply information based on the second conversation scenario.

Content included in the reply information of the user is not fixed. The reply information may include content in reply to the question information, and may alternatively include a question presented by the user. For example, if the question information is "how often do you shop online," and the reply information is "three days," the electronic device may know after semantic analysis of the reply information that, the reply information does not include a question presented by the user, and determine that the second conversation scenario is not triggered. If the question information is "how often do you shop online," and the reply information is "how's the weather today," the electronic device may know after semantic analysis of the reply information that, the reply information includes a question presented by the user, and determine that the second conversation scenario is triggered. If the question information is "how often do you shop online," and the reply information is "three days. How's the weather today," the electronic device know after semantic analysis of the reply information that, the user further presents a question when answering the question. After the above analysis, it is determined that the reply information triggers the second conversation scenario. During semantic analysis of the reply information, the electronic device will set a high weight to the question presented by the user. The electronic device responds to the question with a high weight. In this case, the electronic device should first reply the question presented by the user, instead of presenting the next question based on the user's answer.

In the case where the second conversation scenario is determined to be triggered, the response information corresponding to the reply information is generated, i.e., the electronic device responds to the user's question included in the reply information. For example, if the question information is "how often do you shop online," and the reply information is "how's the weather today," the electronic device may know after semantic analysis of the reply information that, the reply information includes the question presented by the user, and the electronic device generates the response information based on the conversation scenario (i.e., the second conversation scenario) corresponding to "how's the weather today." The response information may be information questioned by the electronic device for the weather, such as: the weather where is queried. Similarly, the response information may also be text information or voice information.

Step 104: outputting the response information to the user.

After determining the response information, the electronic device outputs the response information to the user. When the response information is text information, the electronic device outputs the response information to the user in the text form. When the response information is voice information, the electronic device outputs the response information to the user in the form of voice playing.

The method for man-machine conversation in the present embodiment may not only actively initiate a question to the user, but also respond to the user's question, such that the electronic device of the method for man-machine conversation in the present embodiment may be applied to support two modes of conversation processes: one is a task-based conversation process (e.g., questionnaire, after-sales return visit, and sales lead filtering, which manages outgoing call tasks using an outgoing call queue), and the other is a responsive conversation process (e.g., querying the weather, booking a hotel room, or Q&A knowledge). The task-based conversation process may support not only a single question, but also a list of questions with prior and subsequent logical relationships (sequential relationship, conditional skipping). The responsive conversation process may support not only a task-based conversation scenario (such as querying the weather, booking a hotel room, and renting a car), but also a question-answer pair, a knowledge graph, chatting, and the like.

In the present embodiment, question information is outputted to a user based on a first task of a first conversation scenario; in response to receiving reply information returned by the user, whether to trigger a second conversation scenario is judged based on the reply information; in response to determining the second conversation scenario being triggered based on the reply information, response information corresponding to the reply information is generated based on the second conversation scenario; and the response information is outputted to the user. Thus, in the case where the user triggers the second conversation scenario, the electronic device may respond to the response information of the user in the second conversation scenario, thereby improving the intelligence and fluency of man-machine interaction, and enhancing the performance of man-machine interaction.

Figure 2:
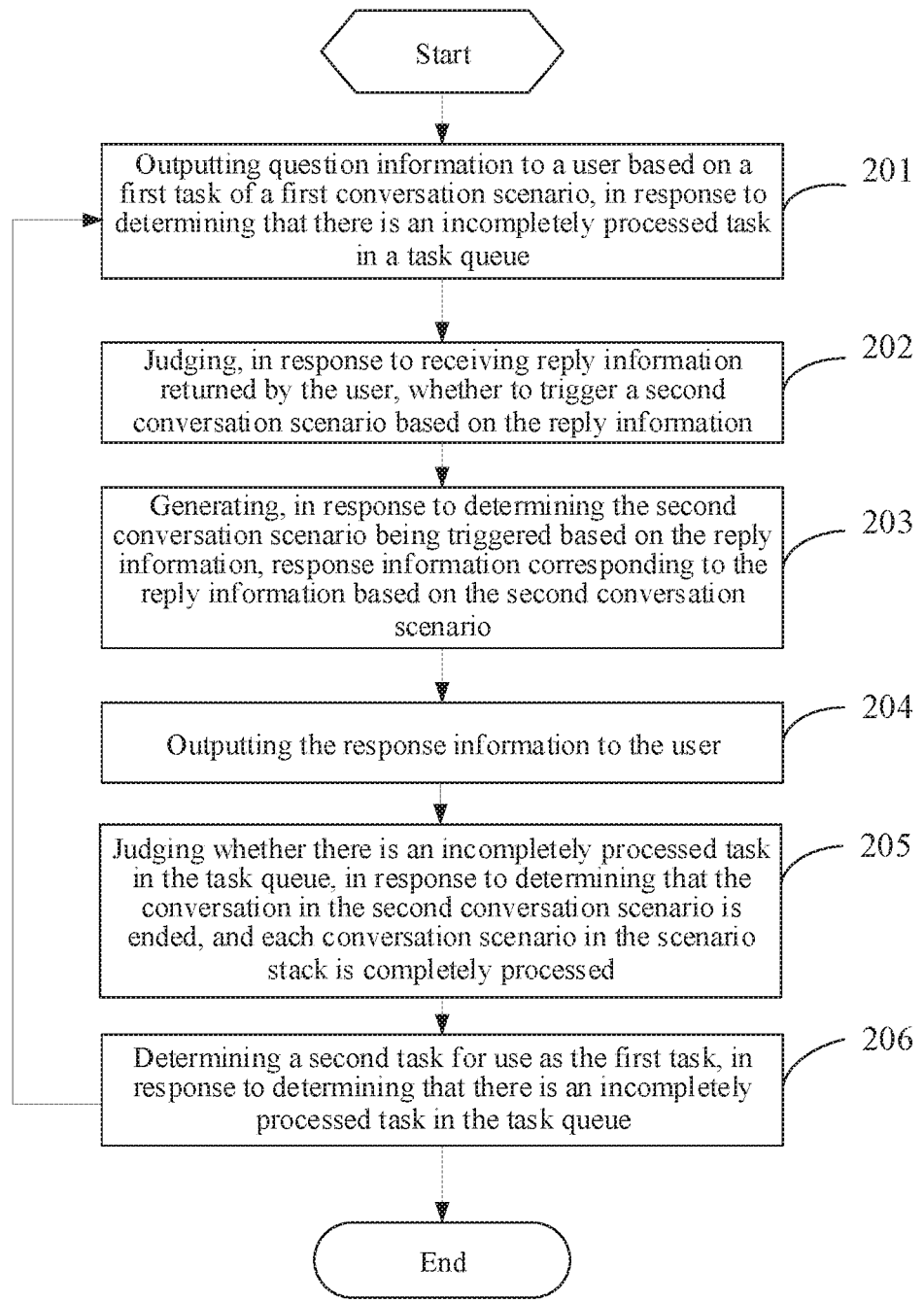
FIG. 2 is a second one of schematic flowcharts of the method for man-machine conversation provided in an embodiment of the present disclosure.

Referring to FIG. 2, FIG. 2 is a flowchart of a method for man-machine conversation provided in an embodiment of the present disclosure. As shown in FIG. 2, the method includes the following steps.

Step 201: outputting question information to a user based on a first task of a first conversation scenario, in response to determining that there is an incompletely processed task in a task queue, the first task being a task currently at a queue head of the task queue.

The method for man-machine conversation in the present embodiment may be applied to a task-based outgoing call scenario, such as questionnaire, after-sales return visit, and sales lead filtering. In the task-based outgoing call scenario, an electronic device of the method for man-machine conversation in the present embodiment is applied to actively initiate a question. The electronic device may be a robot.

The queue is a FIFO (FIRST IN FIRST OUT) data structure, which may be used to implement a sequential conversation task scheduling. A queue storing outgoing call task nodes is known as a task queue (also referred to as an outgoing call queue). The task queue is used for storing tasks of the first conversation scenario.

Figure 3:
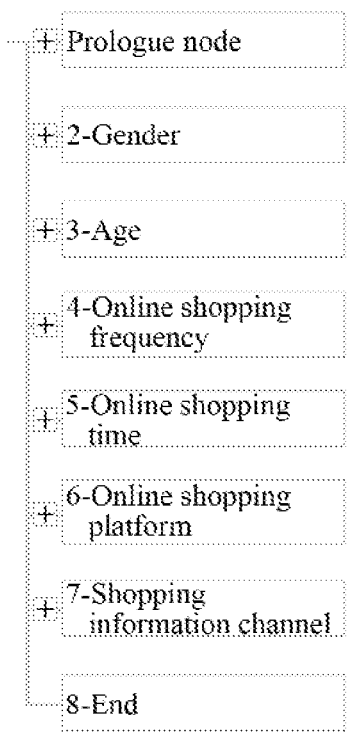
FIG. 3 is a schematic diagram of a task node in a task queue provided in an embodiment of the present disclosure.

Before a conversation begins, the task queue is initialized, and configured top-level nodes of the conversation process are put into the task queue in sequence. For a questionnaire on e-commerce, it is necessary to collect information, such as user's gender, age, online shopping frequency, online shopping time, and online shopping platform. During initialization of the task queue, to-be-collected information points are put into the task queue, as shown in FIG. 3. The tasks (also referred to as task nodes) put into the task queue are prologue nodes, gender, age, online shopping frequency, online shopping time, online shopping platform, and shopping information channel respectively. The electronic device performs task scheduling in sequence of the tasks in the queue by default. When actively initiating the question to the user, the electronic device outputs the question information to the user based on the first task in the first conversation scenario. The first task is a task at a queue head of the task queue. After completing processing the task at the queue head, the task is dequeued, and the next task adjacent to the task is ranked at the queue head. For example, after the electronic device completes a task "online shopping frequency," the task "online shopping frequency" is dequeued, and "network time" adjacent to the "online shopping frequency" is at the queue head position.

The question information may be construed as a question determined based on the first task of the first conversation scenario. For example, for the online shopping frequency (the online shopping frequency is a task) in the above questionnaire scenario, the question information that may be outputted by the electronic device to the user is "how often do you shop online" or "how many times on average do you shop online per week," or the like.

The question information may be text information or voice information, which is not limited here. For example, when the electronic device sends information to the user via a short message (the short message includes a SMS, or a message sent via chatting software), the question information may be outputted in the text form or in the form of voice; while when the electronic device interacts with the user via a voice call, the question information is outputted in the form of voice.

In some embodiments of the present disclosure, the user may be understood as a user interacting with the electronic device via a client. When outputting information to the user, the electronic device outputs information to the client used by the user; and when receiving user information, the electronic device receives information sent by the client used by the user.

The present embodiment additionally provides the task queue, which may support the outgoing call scenario with a fixed task list, such as questionnaire, and after-sales return visit.

Step 202: judging, in response to receiving reply information returned by the user, whether to trigger a second conversation scenario based on the reply information.

The reply information may be text information or voice information, which is not limited here. When the electronic device sends information to the user via a short message, the reply information may be text information or voice information; while when the electronic device interacts with the user via a voice call, the reply information is voice information.

The second conversation scenario is a conversation scenario different from the first conversation scenario. For example, querying the weather, booking a hotel room or Q&A knowledge belong to different conversation scenarios. Both the first conversation scenario and the second conversation scenario can be processed by the electronic device. The electronic device presets a corresponding response strategy for each conversation scenario.

Content included in the reply information of the user is not fixed. The reply information may include content in reply to the question information, and may alternatively include a presented question. If the reply information includes a question presented by the user, then the electronic device needs to reply the question presented by the user, to improve the interactive performance. Judging whether to trigger the second conversation scenario based on the reply information may be understood as whether the reply information includes a question presented by the user.

Step 203: generating, in response to determining the second conversation scenario being triggered based on the reply information, response information corresponding to the reply information based on the second conversation scenario.

In the case where the second conversation scenario is determined to be triggered, the response information corresponding to the reply information is generated, i.e., the electronic device responds to the user's question included in the reply information. For example, if the question information is "how often do you shop online," and the reply information is "how's the weather today," the electronic device may know after semantic analysis of the reply information that, the reply information includes a question presented by the user, and the electronic device generates the response information based on the conversation scenario (i.e., the second conversation scenario) corresponding to "how's the weather today." The response information may be information questioned by the electronic device for the weather, such as: the weather where is queried.

Further, the step 203 specifically includes: pressing, in response to determining the second conversation scenario being triggered based on the reply information, the first conversation scenario into a scenario stack; and generating the response information corresponding to the reply information based on the second conversation scenario.

Accordingly, after outputting the response information to the user, the method further includes: acquiring a conversation scenario on stack top of the scenario stack, in response to determining that a conversation in the second conversation scenario is ended, and there is an incompletely processed conversation scenario in the scenario stack; and determining the conversation scenario on stack top of the scenario stack for use as the first conversation scenario, and executing the outputting question information to the user based on the first task of the first conversation scenario.

Specifically, the stack is a FILO data structure, and during conversation scenario switching in a conversation process, data of the switched conversation scenario (e.g., the first conversation scenario) may be stored using this data structure. A stack storing the conversation scenario data is referred to as a scenario stack. In the present embodiment, pressing the first conversation scenario into a scenario stack may be understood as storing the first conversation scenario and conversation data in the scenario into the scenario stack. The electronic device may return to a state before the first conversation scenario is switched based on the related information, to continue conversation with the user in the first conversation scenario.

Figure 4:
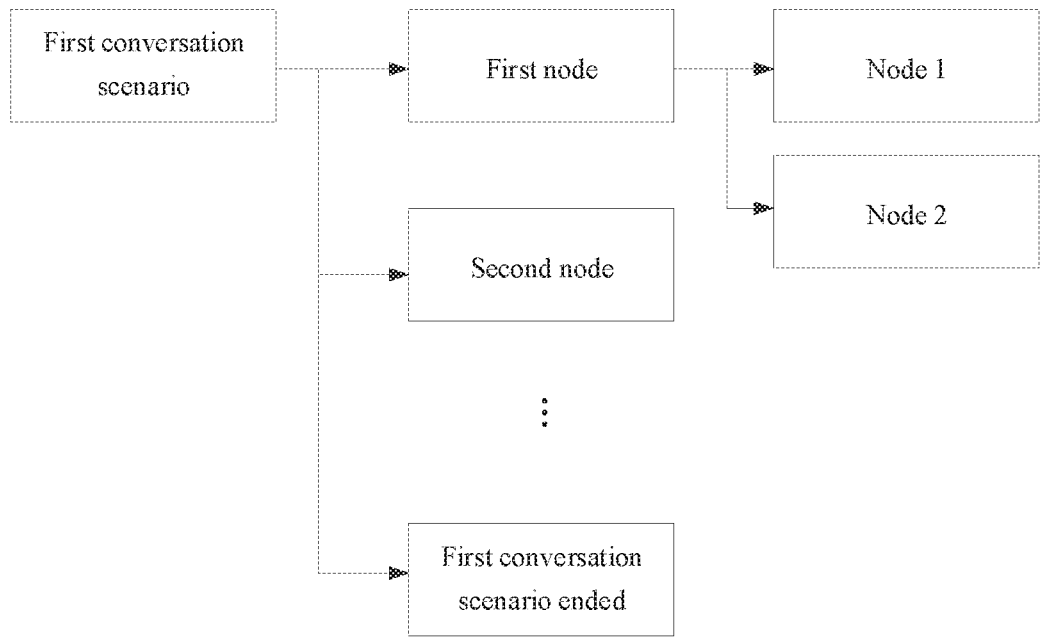
FIG. 4 is a schematic diagram of a task node of a first conversation scenario provided in an embodiment of the present disclosure.

In an outgoing call conversation process, in the case where the current scenario (i.e., the first conversation scenario) is not completed yet, and the user actively enters a new scenario (i.e., the second conversation scenario), the electronic device will press the uncompleted scenario (i.e., the first conversation scenario) and the conversation data in the conversation scenario into the scenario stack. After completing the new scenario, an uncompleted conversation scenario is popped up from stack top of the scenario stack, to return to the pop-up conversation scenario by the user and continue the conversation. As shown in FIG. 4, in FIG. 4, a first node and a second node may be regarded as task nodes of the first conversation scenario, while a node 1 and a node 2 may be considered as child nodes of the first node.

When determining the second conversation scenario being triggered, the electronic device needs to first process the second session scenario. In this case, the first conversation scenario is instacked, i.e., the first scenario is pressed into the scenario stack, such that the electronic device takes out the first conversation scenario from the scenario stack when a conversation in the second conversation scenario is ended, to continue the conversation in the first conversation scenario.

After a completely processed conversation scenario in the scenario stack is outstacked, a conversation scenario adjacent to the conversation scenario is on top of the stack. When all conversation scenarios in the scenario stack are completely processed, the scenario stack is empty.

In the present embodiment, during the conversation, the user is supported to interrupt the conversation, and actively end the conversation, to enhance the user experience.

Further, in response to failure to receive the reply information returned by the user within preset time, the outputting question information to a user based on a first task of a first conversation scenario is executed. That is, when no reply information is received within the preset time, the question information is outputted again to the user to guide the conversation to be continued. Of course, when no reply information is received within the preset time, query information may alternatively be outputted to the user to guide the conversation to be continued. The preset time may be set based on actual situation, and is not defined here.

In the present embodiment, in the process of man-machine conversation, when the user triggers the second conversation scenario, the electronic device will press the first conversation scenario and conversation data into the scenario stack, and then interact with the user in the second conversation scenario. When the second conversation scenario is ended, the electronic device may guide the user to continue entering the uncompleted scenario (i.e., the first conversation scenario), thus improving the user experience.

After the determining, in response to receiving reply information returned by the user, whether to trigger a second conversation scenario based on the reply information, and before the outputting the response information to the user, the method further includes: generating, in response to determining the second conversation scenario failing to be triggered based on the reply information, response information corresponding to the reply information based on the first conversation scenario.

In the present step, the user failing to trigger the second conversation scenario is determined based on the reply information, indicating that the current conversation scenario is still the first conversation scenario. In this case, the electronic device generates the response information corresponding to the reply information based on the first conversation scenario. For example, if the question information is "how often do you shop online," and the reply information is "three days," the electronic device may know after semantic analysis of the reply information that, the reply information does not trigger the second conversation scenario, and the reply information includes reply to the question information. In this case, the electronic device may continue to output question information to the user based on the task in the task queue.

Step 204: outputting the response information to the user.

After determining the response information, the electronic device outputs the response information to the user. When the response information is text information, the electronic device outputs the response information to the user in the text form. When the response information is voice information, the electronic device outputs the response information to the user in the form of voice playing.

Step 205: judging whether there is an incompletely processed task in the task queue, in response to determining that the conversation in the second conversation scenario is ended, and each conversation scenario in the scenario stack is completely processed.

Step 206: determining a second task for use as the first task, in response to determining that there is an incompletely processed task in the task queue, and executing the outputting question information to the user based on the first task of the first conversation scenario, the second task being a task currently at a queue head of the task queue.

Specifically, when processing the conversation scenario on stack top of the scenario stack, the conversation scenario on top of the stack is outstacked, and the conversation scenario adjacent to the conversation scenario is on top of the stack. When completing processing all conversation scenarios in the scenario stack, it may be understood that there is no unprocessed conversation scenario in the scenario stack. In this case, the scenario stack is empty, and the current conversation scenario is a conversation scenario that is last outstacked in the scenario stack.

When processing a task at the queue head of the task queue, the task is dequeued, and the next task adjacent to the task is ranked at the queue head. When completing processing all tasks in the task queue, it may be understood that there is no unprocessed task in the task queue. In this case, the task queue is empty.

If the scenario stack is empty, while the task queue is not empty, the task currently at the queue head of the task queue is used as the first task, and the outputting question information to a user based on a first task of a first conversation scenario is executed. For example, if the task currently at the queue head of the task queue is "online shopping frequency," then the "online shopping frequency" is the first task, and the electronic device outputs the question information to the user based on the "online shopping frequency."

In the present embodiment, the scenario stack is used for storing an old conversation scenario (i.e., the first conversation scenario), preferably processes a new conversation scenario (i.e., the second conversation scenario) triggered by the user, and returns to the old conversation scenario after ending the conversation in the new conversation scenario, to continue executing an uncompleted task in the old conversation scenario, thereby improving the intelligence and fluency of man-machine interaction, and enhancing the performance of man-machine interaction.

The method for man-machine conversation in the present embodiment may not only actively initiate a question to the user, but also respond to the user's question, such that the electronic device of the method for man-machine conversation in the present embodiment may be applied to support two modes of conversation processes: one is a task-based conversation process (e.g., questionnaire, after-sales return visit, and sales lead filtering, which manages outgoing call tasks using an outgoing call queue), and the other is a responsive conversation process (e.g., querying the weather, booking a hotel room, or Q&A knowledge). The task-based conversation process may support not only a single question, but also a list of questions with prior and subsequent logical relationships (sequential relationship, conditional skipping). The responsive conversation process may support not only a task-based conversation scenario (such as querying the weather, booking a hotel room, and renting a car), but also a question-answer pair, a knowledge graph, chatting, and the like.

The electronic device in some embodiments of the present disclosure supports system-level conversation counting control logic. For example, in the process of outgoing call, the speech identification rate is low due to a communication channel or noisy user environment, such that the electronic device cannot clearly understand user expressions. Embodiments of the present disclosure support friendly hanging up a conversation when the counting control continuously or accumulatively reaches a certain threshold. The counting control includes: user's continuous or accumulative silence counting control, user's continuous or accumulative decline counting control, user's continuous or accumulative restatement counting control, and the like.

Figure 5:
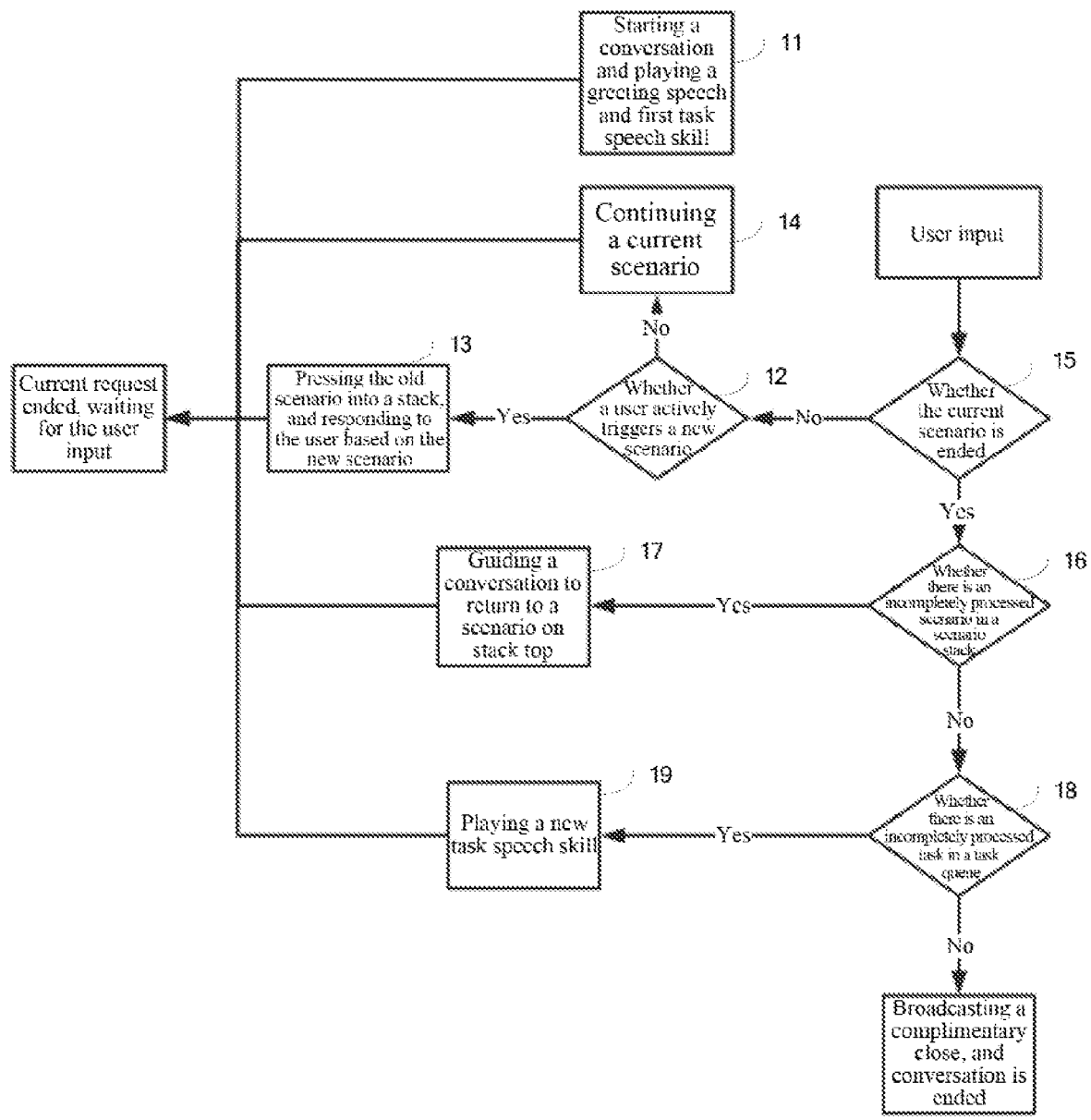
FIG. 5 is a third one of schematic flowcharts of the method for man-machine conversation provided in an embodiment of the present disclosure.

As shown in FIG. 5, FIG. 5 is a flowchart of the method for man-machine conversation provided in an embodiment of the present disclosure. Specific process of the method for man-machine conversation will be described below.

Step 11: starting a conversation, and playing a greeting speech and a first task speech skill. When a call is connected, an outgoing call robot (an electronic device is the outgoing call robot) first actively broadcasts the greeting speech to guide an outgoing call, and presents a question, such as asking whether the user is convenient to answer the call. In this case, the conversation enters a scenario represented by the question (i.e., a first conversation scenario).

Step 12: whether the user actively triggers a new scenario. After listening to a user's answer based on a user's input, the outgoing call robot first judges whether the user actively triggers a new scenario (i.e., a second conversation scenario), if the user actively triggers the new scenario, proceeds to executing step 13; and if the user does not actively trigger the new scenario, proceeds to executing step 14. In the current scenario, a reply is generated to respond to the user.

Step 13: pressing the old scenario (i.e., a current scenario) into a stack, and responding to the user based on the new scenario. The current scenario (i.e., the first conversation scenario) is pressed into a scenario stack, and the reply is generated to respond to the user.

Step 14: continuing the current scenario, i.e., generating the reply in the current scenario to respond to the user. Whilst replying the user, step 15 is executed.

Step 15: judging whether the current scenario is ended. If the current scenario is ended, step 16 is executed.

Step 16: judging whether there is an incompletely processed scenario in a scenario stack, if there is an incompletely processed scenario in the scenario stack, executing step 17; and if there is no incompletely processed scenario in the scenario stack, executing step 18.

Step 17: guiding a conversation to return to a scenario on stack top, i.e., a recent scenario popping up from the stack top, and guiding the user to return to an old scenario via a guiding speech.

Step 18: judging whether there is an incompletely processed task in a task queue, if there is an incompletely processed task in the task queue, executing step 19.

Step 19: playing a new task speech skill, i.e., taking out a task at a queue head from a queue, playing the task to the user.

Step 12 to step 19 are repeatedly executed, until the task queue and the scenario stack are empty, a complimentary close is played, and an outgoing call task is ended.

During the conversation, the user is supported to actively interrupt the conversation, and actively end the conversation, and is further supported to be guided to continue the conversation by actively querying the user in the case where the user is silent, to enhance the user experience.

The method for man-machine conversation in the present embodiment not only supports a robot to actively guide a user, but also supports the robot to passively respond, (a usage scenario stack) may very favorably support the user to actively ask some questions in a process of receiving an outgoing call, to complete a service operation, and may continue to guide the user to return to a preset outgoing call task after responding to the user, thus greatly improving the intelligence and conversation fluency of an outgoing call robot.

The method for man-machine conversation in the present embodiment additionally provides a scenario queue and a scenario stack on the basis of process-based conversation management, supports a preset task list, presses a current scenario into a stack when the user actively jumps out of the current scenario during a conversation, guides the user to return to an uncompleted scenario at an appropriate time point, and may greatly support the user to, e.g., interrupt, become silent, ask a question, and express a new intent during the conversation, whilst completing a preset task, thereby greatly improving the intelligence and fluency of the conversation. In the scenarios, such as urgent collection in the financial industry, sales lead filtering of various industries, questionnaire, and after-sales return visit of the insurance industry, the present disclosure may replace manual work, reduce labor costs of enterprises, and improve the work efficiency.

The method for man-machine conversation in some embodiments of the present disclosure has the following advantages.

The method additionally provides an outgoing call queue, may flexibly support an outgoing call scenario with a fixed task list, such as questionnaire, and after-sales return visit, and supports guiding the conversation to return to the preset task at an appropriate time point after the user interrupts the conversation process.

The method additionally provides the scenario stack, will press the current scenario and conversation data into the stack when the user actively jumps out of a current conversation scenario and enters a new scenario during the conversation, and may guide the user to continue entering the uncompleted scenario when the new scenario is ended and the user is not actively guided to enter the new scenario. This is particularly important in the outgoing call, because the user in the outgoing call is a passive party without an intent to actively guide the conversation to enter the old scenario.

Conversation abilities, such as active and passive task-based conversation, question and answer, chatting, and KG, are integrated to better meet the user changing from being passive to actively asking back some questions (e.g., asking some knowledge in the question-answer form, such as policy, and feasibility) during the outgoing call, actively presenting service needs (such as checking balance, and querying the weather), and further support guiding the conversation back to the last scenario process or a preset outgoing call process after meeting the active needs of the user, to complete the preset task.

The method has a requirement of moderate size for training data, high accuracy, good effects in a closed scenario, and high commercial value.

With a flexible conversation counting control logic (e.g., unidentification, decline, and restatement), the outgoing call conversation process is more humanized, and the conversation state in an abnormal situation is more controllable.

Figure 6:
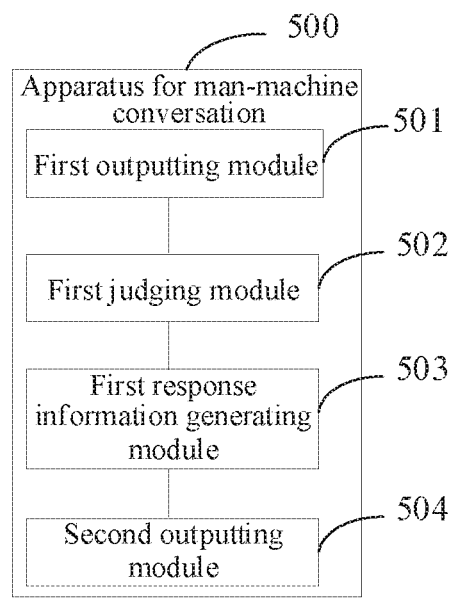
FIG. 6 is a schematic structural diagram of an apparatus for man-machine conversation provided in an embodiment of the present disclosure.

Referring to FIG. 6, FIG. 6 is a schematic structural diagram of an apparatus for man-machine conversation provided in an embodiment of the present disclosure. The present embodiment provides an apparatus 500 for man-machine conversation, including: a first outputting module 501 configured to output question information to a user based on a first task of a first conversation scenario; a first judging module 502 configured to judge, in response to receiving reply information returned by the user, whether to trigger a second conversation scenario based on the reply information; a first response information generating module 503 configured to generate, in response to determining the second conversation scenario being triggered based on the reply information, response information corresponding to the reply information based on the second conversation scenario; and a second outputting module 504 configured to output the response information to the user.

Further, the first outputting module 501 is configured to: output the question information to the user based on the first task of the first conversation scenario, in response to determining that there is an incompletely processed task being in a task queue, where the first task is a task currently at a queue head of the task queue.

Further, the first response information generating module 503 includes: an instacking submodule configured to press, in response to determining the second conversation scenario being triggered based on the reply information, the first conversation scenario into a scenario stack; and a generating submodule configured to generate the response information corresponding to the reply information based on the second conversation scenario.

The apparatus further includes: an acquiring module configured to acquire a conversation scenario on stack top of the scenario stack, in response to determining that a conversation in the second conversation scenario is ended, and there is an incompletely processed conversation scenario in the scenario stack; and a first determining module configured to determine the conversation scenario on stack top of the scenario stack for use as the first conversation scenario, and trigger the first outputting module.

Further, the apparatus 500 further includes: a second judging module configured to judge whether there is an incompletely processed task in the task queue, in response to determining that the conversation in the second conversation scenario is ended, and each conversation scenario in the scenario stack is completely processed; and a second determining module configured to determine a second task for use as the first task, in response to determining that there is an incompletely processed task in the task queue, and trigger the first outputting module; where the second task is a task currently at the queue head of the task queue.

Further, the apparatus 500 further includes: a second response information generating module configured to generate, in response to determining the second conversation scenario failing to be triggered based on the reply information, response information corresponding to the reply information based on the first conversation scenario.

The apparatus 500 for man-machine conversation provided in an embodiment of the present disclosure may implement various processes implemented by the electronic device in the embodiments of the method shown in FIG. 1 and FIG. 2. To avoid repetition, the description will not be repeated here.

The apparatus 500 for man-machine conversation in the present embodiment outputs question information to a user based on a first task of a first conversation scenario; judges, in response to receiving reply information returned by the user, whether to trigger a second conversation scenario based on the reply information; generates, in response to determining the second conversation scenario being triggered based on the reply information, response information corresponding to the reply information based on the second conversation scenario; and outputs the response information to the user. Thus, in the case where the user triggers the second conversation scenario, the electronic device may respond to the response information of the user in the second conversation scenario, thereby improving the intelligence and fluency of man-machine interaction, and enhancing the performance of man-machine interaction.

Figure 7:
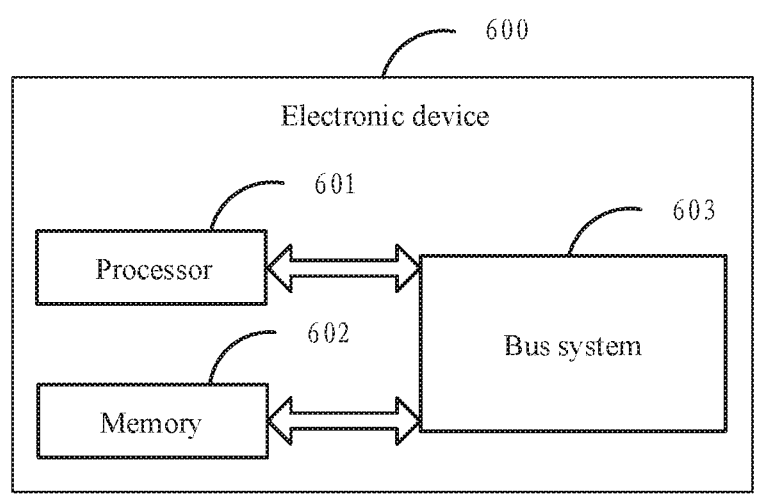
FIG. 7 is a schematic structural diagram of an electronic device provided in some embodiments of the present disclosure.

Referring to FIG. 7, FIG. 7 is a schematic structural diagram of an electronic device provided in some embodiments of the present disclosure. As shown in FIG. 7, the electronic device 600 includes: a processor 601, a memory 602, and a computer program stored on the memory 602 and running on the processor. Various components of the electronic device 600 are coupled together via a bus system 603. It should be understood that the bus system 603 is configured to implement connection communication between these components.

The processor 601 is configured to output question information to a user based on a first task of a first conversation scenario; judge, in response to receiving reply information returned by the user, whether to trigger a second conversation scenario based on the reply information; generate, in response to determining the second conversation scenario being triggered based on the reply information, response information corresponding to the reply information based on the second conversation scenario; and output the response information to the user.

Further, the processor 601 is further configured to: output the question information to the user based on the first task of the first conversation scenario, in response to determining that there is an incompletely processed task in a task queue, where the first task is a task currently at the queue head of the task queue.

Further, the processor 601 is further configured to: press, in response to determining the second conversation scenario being triggered based on the reply information, the first conversation scenario into a scenario stack; and generate the response information corresponding to the reply information based on the second conversation scenario.

Accordingly, after the outputting the response information to the user, the processor 601 is further configured to: acquire a conversation scenario on stack top of the scenario stack, in response to determining that a conversation in the second conversation scenario is ended, and there is an incompletely processed conversation scenario in the scenario stack; and determine the conversation scenario on stack top of the scenario stack for use as the first conversation scenario, and execute the outputting question information to the user based on the first task of a first conversation scenario.

Further, the processor 601 is further configured to: judge whether there is an incompletely processed task in the task queue, in response to determining that the conversation in the second conversation scenario is ended, and each conversation scenario in the scenario stack is completely processed; and determine a second task for use as the first task, in response to determining that there is an incompletely processed task in the task queue, and execute the outputting question information to the user based on the first task of a first conversation scenario; where the second task is a task currently at the queue head of the task queue.

Further, the processor 601 is further configured to: generate, in response to determining the second conversation scenario failing to be triggered based on the reply information, response information corresponding to the reply information based on the first conversation scenario.

The electronic device 600 may implement various processes implemented by the electronic device in the above embodiments. To avoid repetition, the description will not be repeated here.

The electronic device 600 in some embodiments of the present disclosure outputs question information to a user based on a first task of a first conversation scenario; judges, in response to receiving reply information returned by the user, whether to trigger a second conversation scenario based on the reply information; generates, in response to determining the second conversation scenario being triggered based on the reply information, response information corresponding to the reply information based on the second conversation scenario; and outputs the response information to the user. Thus, in the case where the user triggers the second conversation scenario, the electronic device may respond to the response information of the user in the second conversation scenario, thereby improving the intelligence and fluency of man-machine interaction, and enhancing the performance of man-machine interaction.

Some embodiments of the present disclosure further provide a computer readable storage medium, storing a computer program thereon, where the computer program, when executed by a processor, implements each process of the embodiments of the method for man-machine conversation, and may achieve the same technical effects. To avoid repetition, the description will not be repeated here. The computer readable storage medium may include, e.g., a read-only memory (ROM for short), a random access memory (RAM for short), a diskette, or an optical disk.

As will be appreciated by those of ordinary skills in the art, various exemplary units and algorithm steps described in combination with the embodiments disclosed herein may be implemented in electronic hardware, or a combination of computer software and electronic hardware. Whether these functions are performed by hardware or software depends on specific applications and design constraints of the technical solutions. Those skilled in the art may implement described functions for each specific application using different methods, but such implementation should not be considered as falling beyond the scope of the present disclosure.

Those skilled in the art can clearly understand that, for convenience and simplicity of description, corresponding processes in the above embodiments of the method may be referred to for specific working process of the above described system, apparatus and unit. The description will not be repeated here.

It should be understood that the apparatus and method disclosed in the embodiments of the present disclosure may be implemented by other approaches. For example, the embodiments of the above described apparatus are merely illustrative. For example, the division of the unit is only a logical function division and there may be other manners of division during actual implementations, for example, multiple units or components may be combined or may be integrated into another system, or some features may be ignored, omitted, or not performed. In addition, the illustrated or discussed coupling or direct coupling or communication connection between each component may be indirect coupling or communication connection among apparatuses or units via some interfaces, and may be electrical connection, mechanical connection, or other forms of connection.

The units described as separate components may or may not be physically separated, the components illustrated as units may or may not be physical units, that is, they may be in the same place or may be distributed to a plurality of network units. Part or all of the units may be selected according to actual requirements to achieve the purpose of the solutions of the embodiments of the present disclosure.

In addition, the functional units in various embodiments of the present disclosure may be integrated into one processing unit, or each unit may be physically present, or two or more than two units may be integrated into one unit.

The integrated unit may be stored in a computer readable storage medium when it is implemented in the form of a software functional unit and is sold or used as a separate product. Based on such understanding, the technical solutions of the present disclosure essentially, or the part of the technical solutions that contributes to the prior art, or all or part of the technical solutions, may be embodied in the form of a software product which is stored in a storage medium and includes some instructions for causing a computer device (which may be a personal computer, a server, or a network device, and so on) to perform all or part of the steps described in the various embodiments of the present disclosure. The storage medium includes: various media capable of storing program codes, such as a USB flash disk, a mobile hard disk, a ROM, a RAM, a diskette, or an optical disk.

While the above description merely provides specific embodiments of the present disclosure, the scope of protection of the present disclosure is not limited to the specific embodiments, any person skilled in the art may easily conceive of variations and replacements without departing from the technical scope disclosed in the present disclosure. All variations and replacements should fall within the scope of protection of the present disclosure. Therefore, the scope of protection of the present disclosure should be determined by the scope of protection of the appended claims.

What is claimed is:

1. A method for man-machine conversation, comprising:
    outputting question information to a user based on a first task of a first conversation scenario;
    judging, in response to receiving reply information returned by the user, whether to trigger a second conversation scenario based on the reply information;
    pressing, in response to determining that the second conversation scenario is triggered based on the reply information, the first conversation scenario into a scenario stack;
    generating response information corresponding to the reply information based on the second conversation scenario;
    outputting the response information to the user;
    acquiring a conversation scenario on stack top of the scenario stack, in response to determining that a conversation in the second conversation scenario is ended and that there is an incompletely processed conversation scenario in the scenario stack; and
    determining the conversation scenario on the stack top of the scenario stack for use as the first conversation scenario, and executing the outputting question information to the user based on the first task of the first conversation scenario.

2. The method according to claim 1, wherein the outputting question information to a user based on a first task of a first conversation scenario comprises:
    outputting the question information to the user based on the first task of the first conversation scenario, in response to determining that there is an incompletely processed task in a task queue, wherein the first task is a task currently at a queue head of the task queue.

3. The method according to claim 1, wherein after outputting the response information to the user, the method further comprises:
    judging whether there is an incompletely processed task in the task queue, in response to determining that the conversation in the second conversation scenario is ended, and each conversation scenario in the scenario stack is completely processed; and
    determining a second task for use as the first task, in response to determining that there is an incompletely processed task in the task queue, and executing the outputting question information to the user based on the first task of the first conversation scenario;
    wherein the second task is a task currently at the queue head of the task queue.

4. The method according to claim 1, wherein after the judging, in response to receiving reply information returned by the user, whether to trigger a second conversation scenario based on the reply information, and before outputting the response information to the user, the method further comprises:
    generating, in response to determining the second conversation scenario failing to be triggered based on the reply information, response information corresponding to the reply information based on the first conversation scenario.

5. An apparatus for man-machine conversation, comprising:
- at least one processor; and
- a memory storing instructions, wherein the instructions when executed by the at least one processor, cause the at least one processor to perform operations, the operations comprising:
- outputting question information to a user based on a first task of a first conversation scenario;
- judging, in response to receiving reply information returned by the user, whether to trigger a second conversation scenario based on the reply information;
- pressing, in response to determining that the second conversation scenario is triggered based on the reply information, the first conversation scenario into a scenario stack;
- generating response information corresponding to the reply information based on the second conversation scenario;
- outputting the response information to the user;
- acquiring a conversation scenario on stack top of the scenario stack, in response to determining that a conversation in the second conversation scenario is ended and that there is an incompletely processed conversation scenario in the scenario stack; and
- determining the conversation scenario on the stack top of the scenario stack for use as the first conversation scenario, and executing the outputting question information to the user based on the first task of the first conversation scenario.

6. The apparatus according to claim 5, wherein the outputting question information to a user based on a first task of a first conversation scenario comprises:
- outputting the question information to the user based on the first task of the first conversation scenario, in response to determining that there is an incompletely processed task in a task queue, wherein the first task is a task currently at a queue head of the task queue.

7. The apparatus according to claim 5, wherein after outputting the response information to the user, the method further comprises:
- judging whether there is an incompletely processed task in the task queue, in response to determining that the conversation in the second conversation scenario is ended, and each conversation scenario in the scenario stack is completely processed; and
- determining a second task for use as the first task, in response to determining that there is an incompletely processed task in the task queue, and executing the outputting question information to the user based on the first task of the first conversation scenario;
- wherein the second task is a task currently at the queue head of the task queue.

8. The apparatus according to claim 5, wherein after the judging, in response to receiving reply information returned by the user, whether to trigger a second conversation scenario based on the reply information, and before outputting the response information to the user, the method further comprises:
- generating, in response to determining the second conversation scenario failing to be triggered based on the reply information, response information corresponding to the reply information based on the first conversation scenario.

9. A non-transitory computer readable storage medium, storing a computer program thereon, wherein the computer program, when executed by a processor, causes the processor to perform operations, the operations comprising:
- outputting question information to a user based on a first task of a first conversation scenario;
- judging, in response to receiving reply information returned by the user, whether to trigger a second conversation scenario based on the reply information;
- pressing, in response to determining that the second conversation scenario is triggered based on the reply information, the first conversation scenario into a scenario stack;
- generating response information corresponding to the reply information based on the second conversation scenario;
- outputting the response information to the user;
- acquiring a conversation scenario on stack top of the scenario stack, in response to determining that a conversation in the second conversation scenario is ended and that there is an incompletely processed conversation scenario in the scenario stack; and
- determining the conversation scenario on the stack top of the scenario stack for use as the first conversation scenario, and executing the outputting question information to the user based on the first task of the first conversation scenario.

10. The non-transitory computer readable storage medium according to claim 9, wherein the outputting question information to a user based on a first task of a first conversation scenario comprises:
- outputting the question information to the user based on the first task of the first conversation scenario, in response to determining that there is an incompletely processed task in a task queue, wherein the first task is a task currently at a queue head of the task queue.

11. The non-transitory computer readable storage medium according to claim 9, wherein after outputting the response information to the user, the method further comprises:
- judging whether there is an incompletely processed task in the task queue, in response to determining that the conversation in the second conversation scenario is ended, and each conversation scenario in the scenario stack is completely processed; and
- determining a second task for use as the first task, in response to determining that there is an incompletely processed task in the task queue, and executing the outputting question information to the user based on the first task of the first conversation scenario;
- wherein the second task is a task currently at the queue head of the task queue.

12. The non-transitory computer readable storage medium according to claim 9, wherein after the judging, in response to receiving reply information returned by the user, whether to trigger a second conversation scenario based on the reply information, and before outputting the response information to the user, the method further comprises:
- generating, in response to determining the second conversation scenario failing to be triggered based on the reply information, response information corresponding to the reply information based on the first conversation scenario.

* * * * *